May 14, 1963 — KARL EICKMANN — 3,089,516
CONTROL MECHANISM FOR HYDRAULIC APPARATUS
Filed Oct. 24, 1960
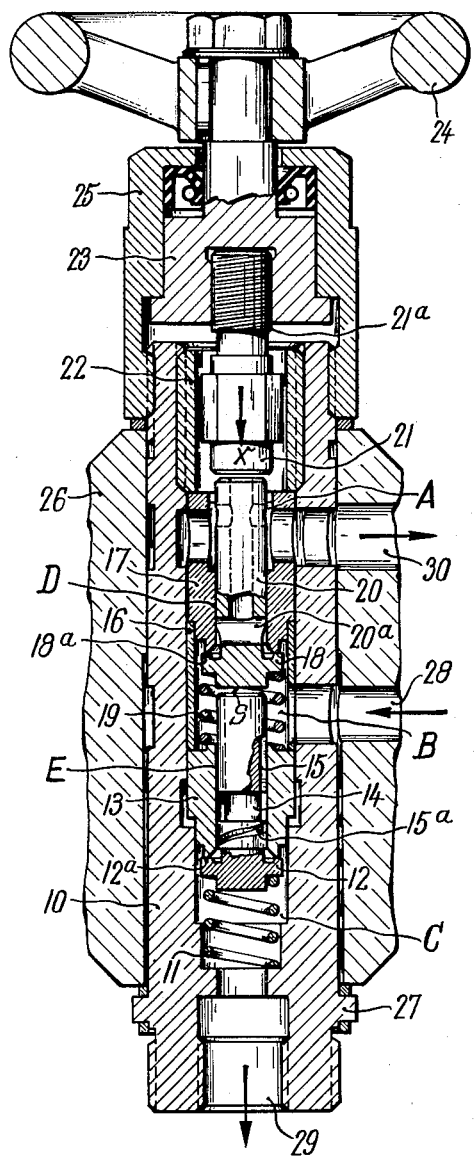
INVENTOR.
Karl Eickmann
BY Michael S. Striker
Attorney

United States Patent Office 3,089,516
Patented May 14, 1963

3,089,516
CONTROL MECHANISM FOR HYDRAULIC
APPARATUS
Karl Eickmann, 2420 Isshiki Hayama-machi,
Kanagawa-ken, Japan
Filed Oct. 24, 1960, Ser. No. 64,319
16 Claims. (Cl. 137—620)

The present invention relates to a control mechanism for hydraulically operated apparatus, and especially for such apparatus, for example, hoisting apparatus, which are operated by means of very high pressures. This control mechanism is adapted to be connected to a feed line, a power line leading to the apparatus to be operated, and a return line, and it comprises a pressure control valve which preferably opens automatically and may also be opened manually from the outside, and which is interposed between the feed line and the power line leading to the hydraulic apparatus, and a return valve which is interposed between the feed line and the return line.

It is an object of the invention to provide a valve arrangement in which apart from the valve passages which are controlled by the valves there are no joints or seams by-passing these valve passages and formed by any movable parts between the valve chambers into which the pressure is supplied and the power and return lines or the outer atmosphere. Thus, even at very high pressures any leakage losses caused by such joints, seams, or the like by-passing the valve passage will be avoided and also any resilient gaskets and the like which are not suitable for high pressures of, for example, 100 to 1000 atm. since they are deformed or soon destroyed by such pressures.

An essential feature of the present invention therefore consists in providing the pressure control valve in a position coaxially with and behind the return valve which opens in the same direction as the pressure control valve, and in mounting both valves within the valve housing so as to be slidable within stationary parts. The only seams or joints which then exist between the feed line, the power line, and the return line or the outer atmosphere are formed by the valve passages themselves, that is, by passages which are controlled by the movable valves. The guide surfaces of the valves are preferably devoid of any flexible sealing elements and they also form the passages for the pressure medium.

A further object of the invention consists in providing a control mechanism which is made of the smallest possible diameter so as to permit the same to be inserted in simple bores in a machine housing. This is of particular advantage since it renders the mechanism especially suitable for controlling very high pressures of several hundred to 1000 atm. because the valves may then be located very close to the cylinders of the machine which are operated by the pressure medium so that only short conduits will then be required. The influence of the high pressures upon the output caused by the compression or change in volume of the pressure fluid may then be almost completely avoided so that a very economic operation and a high pressure output will be insured. By such a construction it is also possible to install the control mechanism according to the invention in practically any pump.

A further object of the invention is to provide a valve arrangement and valve operation which attain very particular advantages. In particular, the valves which are arranged coaxial with each other are disposed in the closed position at an axial distance from each other so that the pressure control valve will not open until the return valve, which is first opened by a control member, has carried out a stroke of a certain length.

Another feature of the invention consists in subjecting the valves to the action of springs which have the tendency to close the valves. The valves are preferably of the flat-seat type so as to be especially suitable for high pressures.

A still further object of the invention consists in providing a control mechanism of a construction which may be easily and quickly assembled. According to a very preferred embodiment of the invention it is therefore possible to insert the valves and a control element for adjusting these valves, as well as bushings for guiding the valves and containing the valve seats into the valve housing from one end thereof, especially from the end containing the control element.

These objects, features, and advantages of the present invention will become more apparent from the following detailed description thereof, particularly when the same is read with reference to the accompanying drawing, which illustrates one preferred embodiment of the invention, as seen in a central longitudinal section thereof.

The control mechanism according to the invention consists of a tubular valve housing 10 with a longitudinal bore therein, the wall of which is provided with several recesses and into which bushings 13 and 17 are tightly fitted so that between these bushings and at both sides thereof the chambers A, B, and C are formed.

Bore E in bushing 13 guides a pressure control valve 12 which is designed as a flat-seat valve and is acted upon by a coil spring 11 and the sealing surface 12a of which engages with the corresponding valve seat on bushing 13, while its valve shaft 14 which is provided with longitudinal grooves 15 and a helical groove 15a is slidable along bore E. Bushing 13 engages on a spacing sleeve 16 which, in turn, engages on a bushing 17. This bushing 17 has a sealing surface which serves as a valve seat which is associated with a sealing surface 18a on the return valve 18 which is acted upon by a coil spring 19 and has a shaft 20 with bores therein which is guided in bore D of bushing 17. A plunger 21 which is adapted to act upon shaft 20 is slidable within a bushing 22 and prevented from rotating therein by any suitable means, for example, by being of an angular cross section, by splines, pins, or the like.

Plunger 21 is connected by screw threads 21a to a shaft 23 which is rotatably mounted in a cap nut 25 and carries on its free end a control member, for example, a hand wheel 24. Cap nut 25 is tightly screwed upon valve housing 10 and, in cooperation with a flange 27, it thus secures the valve housing in a fixed position in a bore in the respective machine 26 with which the control mechanism is associated. The pressure medium to be controlled, such as oil passes, for example, from a pump through a feed line 28 into valve housing 10 and it is conducted therefrom through a bore 29 to the place of consumption. The return line is connected at 30.

If plunger 21 is moved by handwheel 24 in the direction opposite to that indicated by arrow $x$ to its farthest position toward the right, valve 18 is released and engages with its seat on bushing 17. Since shaft 14 of valve 12 is spaced from valve 18 by a distance *s*, valve 12 also engages with its seat on bushing 13 and thus remains closed as long as the pressure medium does not act upon the valve to open the same. When the pressure medium enters into chamber B, it is prevented from emerging through chamber A by the return valve 18 which acts as a check valve. Valve 12 will then, however, be opened under the pressure of the pressure medium which can then pass through the longitudinal grooves 15 into chamber C and then through bore 29 to the place of consumption, for example, to a press or a hoisting apparatus.

If handwheel 24 is turned so as to move valve 18 in the direction of arrow *x* to open it to the extent of the distance *s*, the pressure medium entering from feed line 28 will flow through valve 18 and bores 20 back through the return line 30. The pressure will thus be released and valve 12 will close under the action of coil spring 11 so that the pressure medium contained in the respective pressure-controlled apparatus cannot flow back and this apparatus will remain in its particular position of operation. If handwheel 24 is further turned, plunger 21 will move valve 18 further in the direction of arrow *x* and thus open this valve still further, whereby valve 12 will also be opened by the engagement of valve 18 with shaft 14 and against the action of coil spring 11. The pressure medium contained in the apparatus to be controlled may then escape from the latter by passing through bore 29, valve 12, longitudinal grooves 15, bores 20a and return line 30.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a control mechanism for hydraulic apparatus, a substantially tubular valve housing having a single continuous aperture therein forming at least three chambers disposed in a row behind each other, insert means rigidly inserted into said tubular valve housing and formed with two coaxial bores, the first of said bores connecting the first and second of said chambers, the second bore connecting the second and third of said chambers, a first conduit connected to said first chamber and adapted to serve as a return line for a pressure medium, a second conduit connected to said second chamber and adapted to serve as a feed line for said pressure medium, and a third conduit connected to said third chamber and adapted to be connected to the hydraulic apparatus, a first valve adapted to serve as a return valve, movable in the axial direction within said first bore and guided by the wall thereof, control channels connecting said first and second chambers and disposed between the guide surfaces of said first valve and said first bore in said valve housing, said first valve having valve control means for controlling said control channels, and a second valve adapted to serve as a pressure control valve movable in the axial direction within said second bore and guided by the wall thereof, control channels connecting said second and third chambers and disposed between the guide surfaces of said second valve and said second bore in said valve housing, said second valve having valve control means for controlling the last-mentioned control channels, said valve control means on said first and second valves being designed so that for opening the associated control channels, said first valve is adapted to move to the open position into said second chamber and said second valve is adapted to move to the open position into said third chamber.

2. In a control mechanism as defined in claim 1, first resilient means acting upon and tending to close said first valve and second resilient means acting upon and tending to close said second valve, and valve actuating means adapted to act in the axial direction upon said first valve to open the same so that, when said actuating means are actuated, said first valve and through said first valve also said second valve are moved.

3. A control mechanism as defined in claim 2, and said first and second conduits within said valve housing communicating with and extending radially to the axis of said bores, said third conduit extending in the axial direction through the end of said housing opposite to the end containing and carrying said valve actuating means.

4. A control mechanism as defined in claim 1, in which said third conduit extends in the axial direction through one end of said valve housing, said continuous aperture increasing stepwise in width from said third conduit to the other end of said valve housing so that said insert means together with said two valves may be inserted into said valve housing from said other end thereof, valve actuating means at least partly inserted in the axial direction into the wider part of said continuous aperture and adapted to act in the axial direction upon said valves, a cap-shaped member fitted over and closing said other end of said valve housing, means on said cap-shaped member for mounting said valve actuating means, and means for securing said cap-shaped member to said valve housing.

5. A control mechanism as defined in claim 4, in which said cap-shaped member is also adapted to secure said valve within a bore in a machine housing.

6. A control mechanism as defined in claim 1, in which said two valves are disposed in the axial direction behind each other and are spaced by a small axial distance from each other within said bores, valve actuating means adapted to act in the axial direction upon said first valve to open the same so that, when said actuating means are actuated, at first only said first valve is opened and then after said first valve has been moved to traverse said distance, it engages with said second valve so as also to move said second valve to open the same.

7. A control mechanism as defined in claim 1, in which said valve housing has a substantially uniform cylindrical outer diameter so as to be adapted to be inserted into a bore in a machine housing.

8. A control mechanism as defined in claim 1, in which each of said two valves comprises a shaft portion within one of said bores and guided by the wall thereof, and a valve head having said valve control means thereon, said valve control means comprising valve sealing surfaces extending vertically to the axis of said valve.

9. A control mechanism as defined in claim 1, in which said insert means comprise a first bushing rigidly inserted into said tubular member and containing said first bore and forming the valve seat for said first valve control means, and a second bushing rigidly inserted into said tubular member and containing said second bore and forming the valve seat for said second valve control means.

10. A control mechanism as defined in claim 1, in which said tubular member has a continuous bore therein extending substantially along the length of said two valves, said insert means comprising a first bushing rigidly inserted into said tubular member and containing said first bore and forming the valve seat for said first valve control means, and a second bushing rigidly inserted into said tubular member and containing said second bore and forming the valve seat for said second valve control means.

11. A control mechanism as defined in claim 1, in which said tubular member has a substantially uniform cylindrical outer diameter so as to be adapted to be inserted into a bore in a machine housing, said tubular member also having a continuous bore therein extending substantially along the length of said two valves, said insert means comprising a first bushing rigidly inserted into said continuous aperture and containing said first bore and forming the valve seat for said first valve control means, and a second bushing rigidly inserted into said continuous aperture and containing said second bore and forming the valve seat for said second valve control means.

12. A control mechanism as defined in claim 1, in which said insert means comprise a bushing rigidly inserted into said tubular body and containing said first bore and forming the valve seat for said first valve control means, and a second bushing rigidly inserted into said tubular member and containing said second bore and forming the valve seat for said second valve control means, and in which each of said two valves comprises a shaft portion within one of said bores and guided by the wall thereof, and a valve head having said valve control means thereon, said valve control means comprising valve sealing surfaces extending vertically to the axis of said valve and operatively associated with said valve seats formed by said bushings.

13. A control mechanism for hydraulic apparatus comprising, in combination, tubular valve housing means having a longitudinal axis and being formed in the interior thereof with a pair of valve seats spaced in axial direction; first passage means extending transverse to said axis into the interior of said valve housing means between one end thereof and one of said valve seats and adapted to be connected to a return line for a pressure fluid; second passage means extending transverse to said axis into the interior of said valve housing means between said valve seats and adapted to be connected to a feed line for said pressure fluid; third passage means extending in axial direction through the other end of said valve housing means and adapted to be connected to the hydraulic apparatus for feeding said pressure fluid thereto; return valve means movable in axial direction and cooperating with said first valve seat for preventing passage of pressure fluid between said first and said second passage means when said return valve means engages said first valve seat, said return valve means including spring means tending to keep said first valve means in engagement with said first valve seat; pressure control valve means movable in axial direction and cooperating with said second valve seat for preventing passage of pressure fluid between said second and third passage means when said pressure control valve means engages said second valve seat, said pressure control valve means including spring means tending to keep said control valve means in engagement with said second valve seat while permitting opening of said pressure control valve means when the pressure of the pressure fluid entering said valve housing means through said second passage means and acting on said control valve means exceeds a predetermined pressure, said pressure control valve means including a valve stem extending in axial direction toward but spaced a preselected distance from said return valve means; and valve actuating means extending through said one end of said tubular housing means and movable in axial direction from a retracted position to a first actuating position engaging said return valve means for moving the same away from said first valve seat a distance smaller than said preselected distance and from there to a second actuating position in which said return valve means is moved in axial direction a distance greater than said preselected distance so that said return valve means engages said valve stem of said pressure control valve means to move the latter also to an open position.

14. A control mechanism for hydraulic apparatus comprising, in combination, tubular valve housing means having a longitudinal axis and being formed in the interior thereof with a pair of valve seats spaced in axial direction; first passage means extending transverse to said axis into the interior of said valve housing means between one end thereof and one of said valve seats and adapted to be connected to a return line for a pressure fluid; second passage means extending transverse to said axis into the interior of said valve housing means between said valve seats and adapted to be connected to a feed line for said pressure fluid; third passage means extending in axial direction through the other end of said valve housing means and adapted to be connected to the hydraulic apparatus for feeding said pressure fluid thereto; an annular shoulder integrally formed with said valve housing means in the region of said other end thereof; return valve means movable in axial direction and cooperating with said first valve seat for preventing passage of pressure fluid between said first and said second passage means when said return valve means engages said first valve seat, said return valve means including spring means tending to keep said first valve means in engagement with said first valve seat; pressure control valve means movable in axial direction and cooperating with said second valve seat for preventing passage of pressure fluid between said second and third passage means when said pressure control valve means engages said second valve seat, said pressure control valve means including spring means tending to keep said control valve means in engagement with said second valve seat while permitting opening of said pressure control valve means when the pressure of the pressure fluid entering said valve housing means through said second passage means and acting on said control valve means exceeds a predetermined pressure, said pressure control valve means including a valve stem extending in axial direction toward but spaced a preselected distance from said return valve means; valve actuating means extending through said one end of said tubular housing means and movable in axial direction from a retracted position to a first actuating position engaging said return valve means for moving the same away from said first valve seat a distance smaller than said preselected distance and from there to a second actuating position in which said return valve means is moved in axial direction a distance greater than said preselected distance so that said return valve means engages said valve stem of said pressure control valve means to move the latter also to an open position; a cap-shaped member fitted over and closing said one end of said valve housing means and having an annular end face spaced from and facing said shoulder; means in said cap-shaped member for mounting said valve actuating means movable in axial direction; and cooperating screw threads formed at said one end of said valve housing means and said cap-shaped member for securing said cap-shaped member to said valve housing means, whereby said tubular valve housing means may be inserted into a bore formed in a wall of a machine housing and securely held therein with the wall clamped between said shoulder and said end face of said cap-shaped member.

15. In a control mechanism for hydraulic apparatus, in combination, an elongated cylindrical valve housing having a longitudinal axis and being formed with a single stepped bore extending in direction of said longitudinal axis, said stepped bore having at one end of said housing a maximum diameter only slightly smaller than the outer diameter of said housing so as to provide at said one end a wall thickness able to withstand pressure of hydraulic fluid fed into said housing; insert means in said bore insertable through said one end of said housing and having an outer peripheral surface in sealing engagement with the surface of said stepped bore, said insert means defining in said bore three chambers spaced in direction of said longitudinal axis one after the other and said insert means being formed with two bores coaxial with said longitudinal axis and respectively providing communication between said chambers; valve means in each of said two bores and respectively guided by the peripheral surface thereof and each movable between an open and a closed position; valve operating means coaxial with said longitudinal axis and operatively connected to said valve means for moving the same between said positions thereof; and a plurality of passage means respectively communicating with said chambers for feeding pressure fluid into and out of the latter.

16. A mechanism as defined in claim 15 in which said elongated housing is formed at the other end thereof with an outwardly projecting annular shoulder having a first clamping face substantially normal to said longitudinal axis; and including a cap screwed onto said one end of said housing and closing said one end, said cap having an outer annular shoulder extending beyond the outer surface of said housing and having a second clamping face substantially parallel to and facing said first clamping face, whereby said tubular housing may be inserted into a bore of an hydraulic apparatus and be clamped therein with the portion of the housing between said first and said second clamping face sealed in the bore of the hydraulic apparatus.

References Cited in the file of this patent

UNITED STATES PATENTS

| | | |
|---|---|---|
| 2,225,082 | Orshansky et al. | Dec. 17, 1940 |
| 2,526,406 | Pfauser | Oct. 17, 1950 |
| 2,607,599 | Kanuch | Aug. 19, 1952 |
| 2,617,444 | Gardner | Nov. 11, 1952 |
| 2,796,081 | Dannevig et al. | June 18, 1957 |
| 2,825,309 | Geiger | Mar. 4, 1958 |
| 2,918,937 | Kozel | Dec. 29, 1959 |